(12) United States Patent
Schmidt et al.

(10) Patent No.: US 6,189,952 B1
(45) Date of Patent: Feb. 20, 2001

(54) MOTOR VEHICLE

(75) Inventors: Joachim Schmidt, Lotte; Franz-Josef Brockhoff, Belm; Holger Alsago, Horneburg, all of (DE)

(73) Assignee: Wilhelm Karmann GmbH, Osnabrueck (DE)

(*) Notice: Under 35 U.S.C. 154(b), the term of this patent shall be extended for 0 days.

(21) Appl. No.: 09/134,111

(22) Filed: Aug. 14, 1998

(30) Foreign Application Priority Data

Aug. 16, 1997 (DE) .......................................... 297 14 656 U

(51) Int. Cl.⁷ .................................................. B62D 25/20
(52) U.S. Cl. ...................... 296/188; 296/203.03; 296/204
(58) Field of Search ................................. 296/188, 205, 296/203.03, 204, 186

(56) References Cited

U.S. PATENT DOCUMENTS

| | | | |
|---|---|---|---|
| 2,525,339 | | 10/1950 | Chausson . |
| 2,597,837 | * | 5/1952 | Lindsay ................................. 296/186 |
| 3,172,669 | * | 3/1965 | Barenyi ................................ 296/188 |
| 4,457,555 | * | 7/1984 | Draper ................................. 296/186 |
| 4,747,636 | | 5/1988 | Harasaki et al. ..................... 296/186 |
| 4,934,751 | * | 6/1990 | Shimoda .............................. 296/188 |
| 5,018,780 | * | 5/1991 | Yoshii et al. ..................... 296/204 X |
| 5,228,741 | * | 7/1993 | Ide ....................................... 296/188 |
| 5,941,597 | * | 8/1999 | Horiuchi et al. ................. 296/188 X |

FOREIGN PATENT DOCUMENTS

| | | | |
|---|---|---|---|
| 8334199 | | 2/1984 | (DE) . |
| 9104077 | | 9/1992 | (DE) . |
| 295 00 093 U | | 5/1995 | (DE) . |
| 195 31 982 | | 3/1996 | (DE) . |
| 195 38 460 | | 4/1997 | (DE) . |
| 196 03 098 | | 7/1997 | (DE) . |
| 519207 | * | 12/1992 | (EP) ..................................... 296/205 |
| 2698600 | * | 6/1994 | (FR) ..................................... 296/188 |
| 510945 | * | 8/1939 | (GB) .................................... 296/205 |
| 484658 | * | 9/1953 | (IT) ................................... 296/203.03 |
| 199774 | * | 10/1985 | (JP) ..................................... 296/204 |
| 41987 | * | 2/1990 | (JP) ..................................... 296/205 |
| 405077767 | * | 3/1993 | (JP) ..................................... 296/188 |
| 406099851 | * | 4/1994 | (JP) ................................... 296/203.03 |
| WO 9112164 | | 8/1991 | (WO) . |

* cited by examiner

*Primary Examiner*—Dennis H. Pedder
(74) *Attorney, Agent, or Firm*—Jordan and Hamburg LLP

(57) ABSTRACT

A passenger car, such as a coupe or a convertible includes a car body having a B column and side walls which limit the occupants' space below a window breast and within the vertical extent of which in each case the B column is disposed. Essentially vertically aligned reinforcing profiles are assigned to the car body walls in the region of the B columns for absorbing forces acting laterally on the vehicle, which reinforcing profiles in each case are provided with at least one cantilever arm extending therefrom, and which is supported in each case at least at its end averted from the reinforcing profile at a part of the car body.

4 Claims, 16 Drawing Sheets

MOTOR VEHICLE

BACKGROUND OF THE INVENTION

Figure 1:
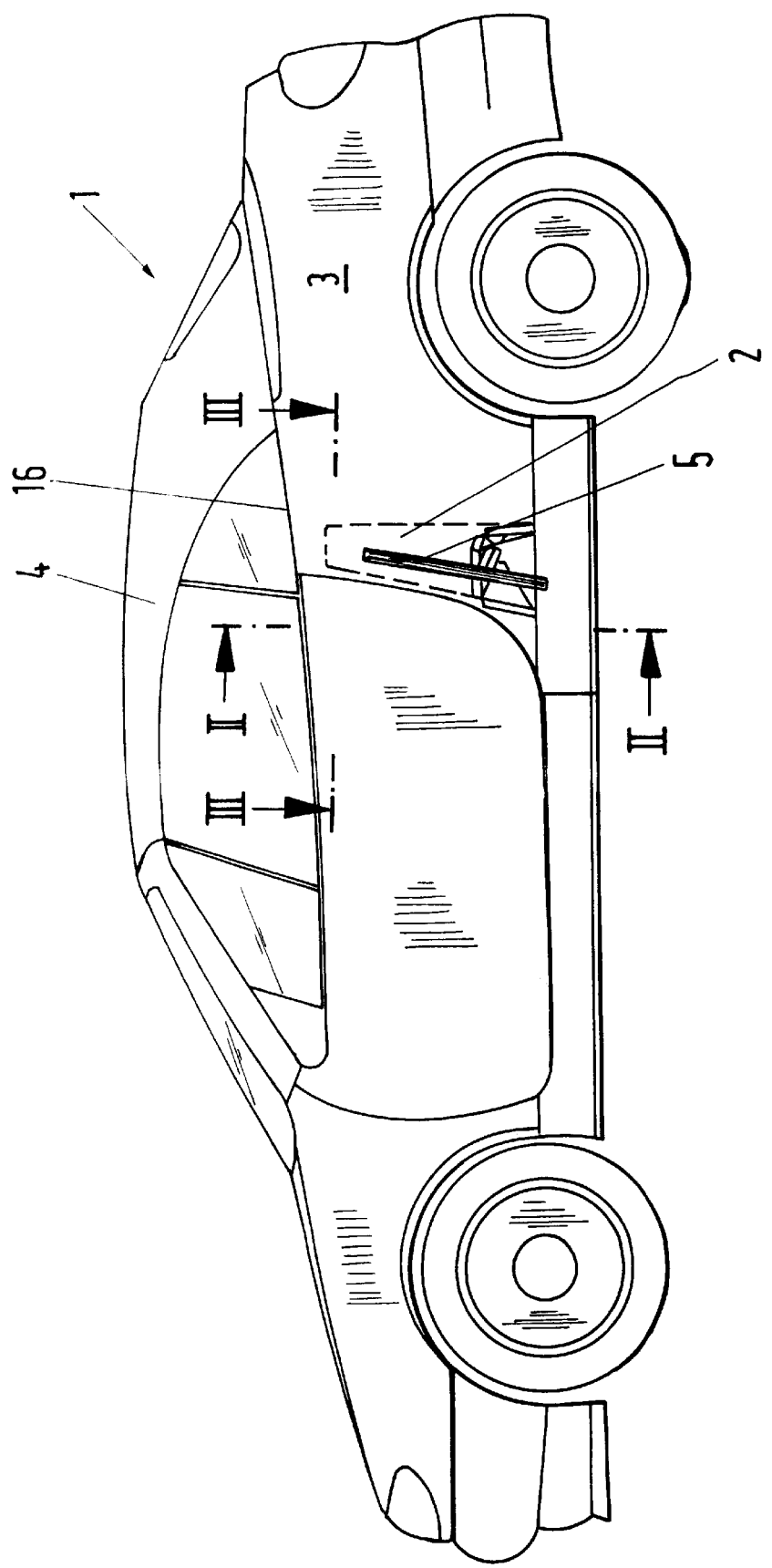

Passenger cars basically have the problem of being relatively poorly protected against a collision from the side, since only a slight collapsible zone is available here. Especially vehicles, in which the B column is disposed within the vertical extent of a side wall of the car body forming the occupants' space below a window breast, have the peculiarity that the B column ends below the window breast and that therefore neither a transverse beam, spanning the occupants' space in the form of a roll bar in the case of a convertible nor a lashing to the roof of the B columns in the case of a closed vehicle, is present. As a result, the stability of the side walls is relatively slight, so that, in the case of a side collision, considerable intrusion can occur and endanger the occupants.

SUMMARY OF THE INVENTION

It is therefore an object of the invention to improve the safety of passenger cars, especially of vehicles, in which the B column ends below the window breast, from the point of view of collisions with laterally acting forces.

Pursuant to the invention, an essentially vertical reinforcing profile is used in the region of the B column. Due to this use, a large part of the height of the side wall is reinforced, so that the forces introduced at different heights, in collisions with sports cars, on the one hand, and with higher sports utility vehicles, on the other, can be intercepted effectively. A cantilever arm, connected with the reinforcing profile, conducts the forces introduced into an averted region of the car body, which thereby participates in the deformation and thus brings about an effective distribution of the conversion of the impact energy.

If the cantilever arm, according to a further distinguishing feature, extends transversely from the reinforcing profile in the direction of the longitudinal center plane of the vehicle, a part of the force, when a lateral force is acting, is introduced into a central region of the floor group of the vehicle, so that this participates in the deformation.

If the cantilever arms are stressed in torsion by a side collision, an additional dissipation of energy is achieved; moreover, the cantilever arms can be displaced into easily accessible regions of the car body, without having to penetrate transversely through the occupants' space.

In the case of a preferred construction of the reinforcing profile and/or of the cantilever arm or arms as pipe sections, the manufacture of such side impact protection is simplified, since special reinforcing profile cross sections, fitted to the respective vehicle, do not have to be produced.

Further distinguishing features and advantages of the invention arise out of the following description of several examples of the object of the invention, illustrated in the drawings.

IN THE DRAWINGS

Figure 2:
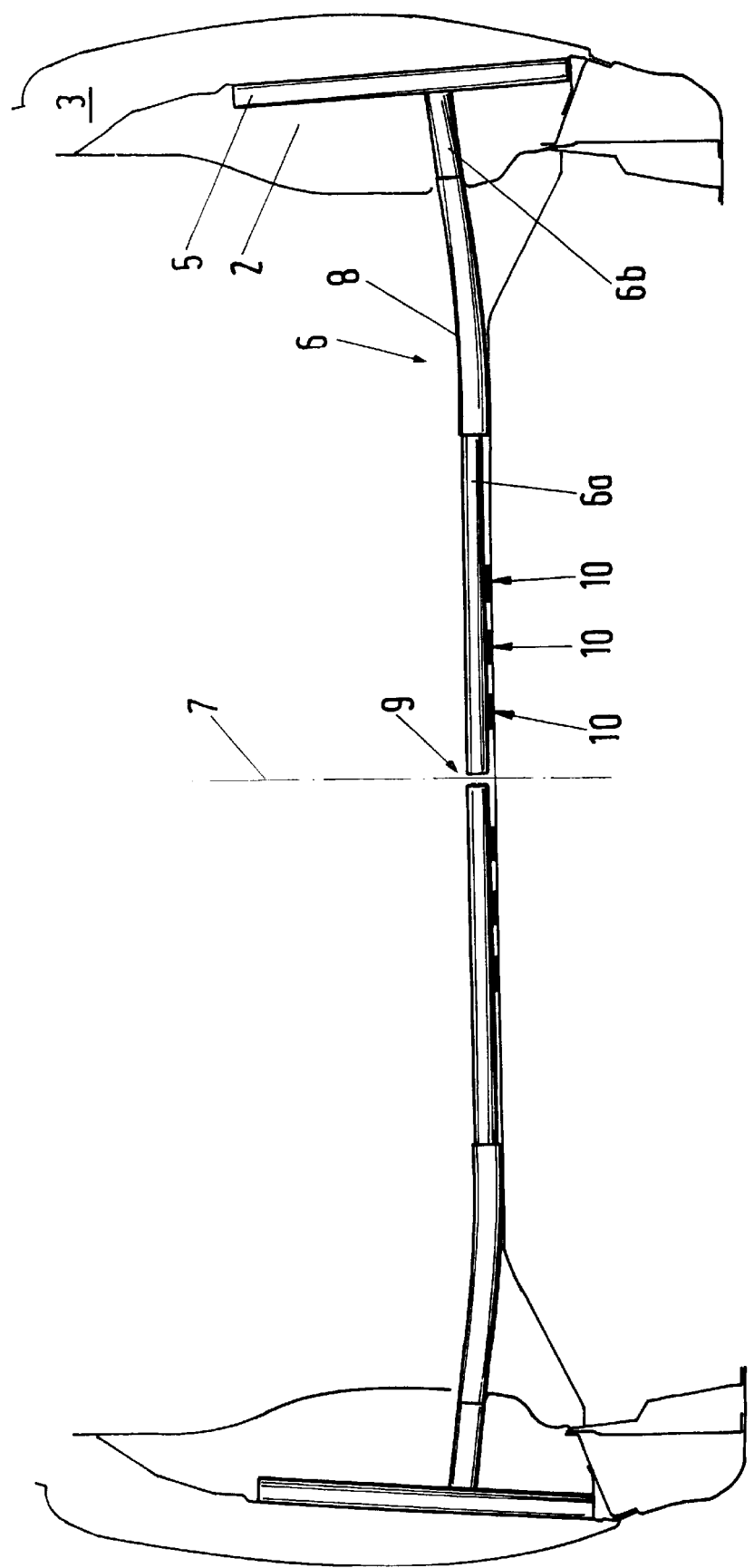
Figure 3:
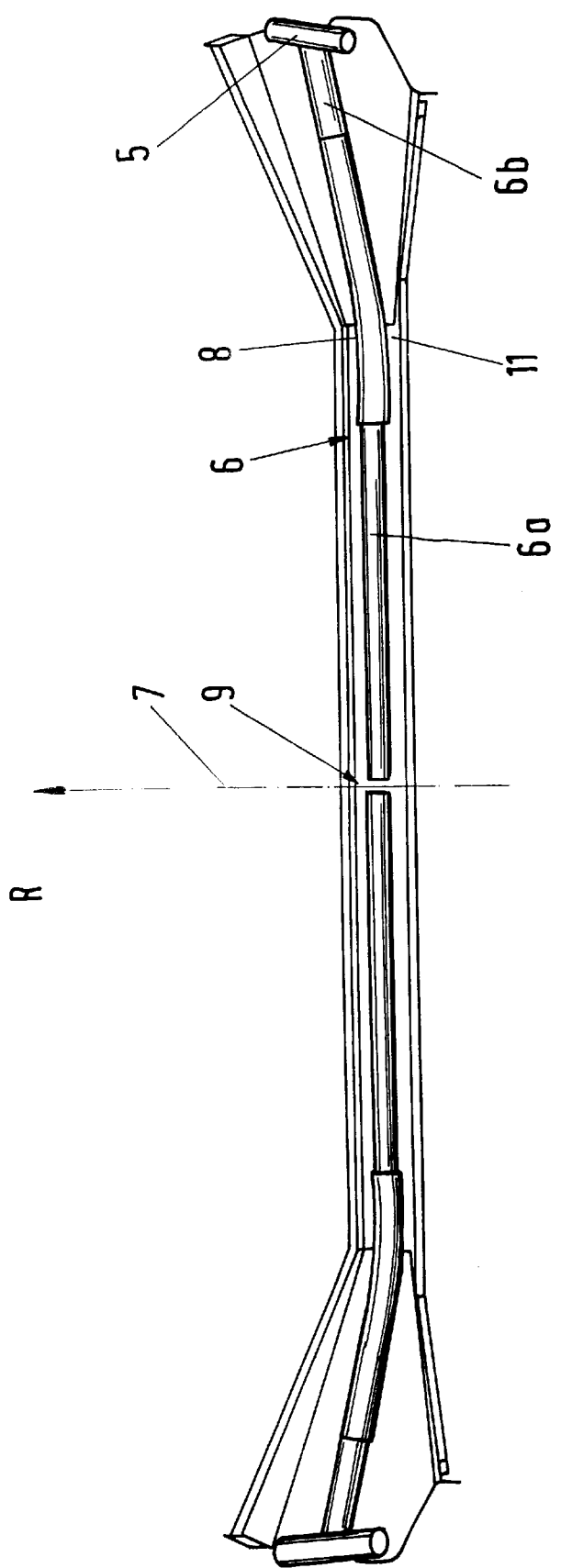
Figure 4:
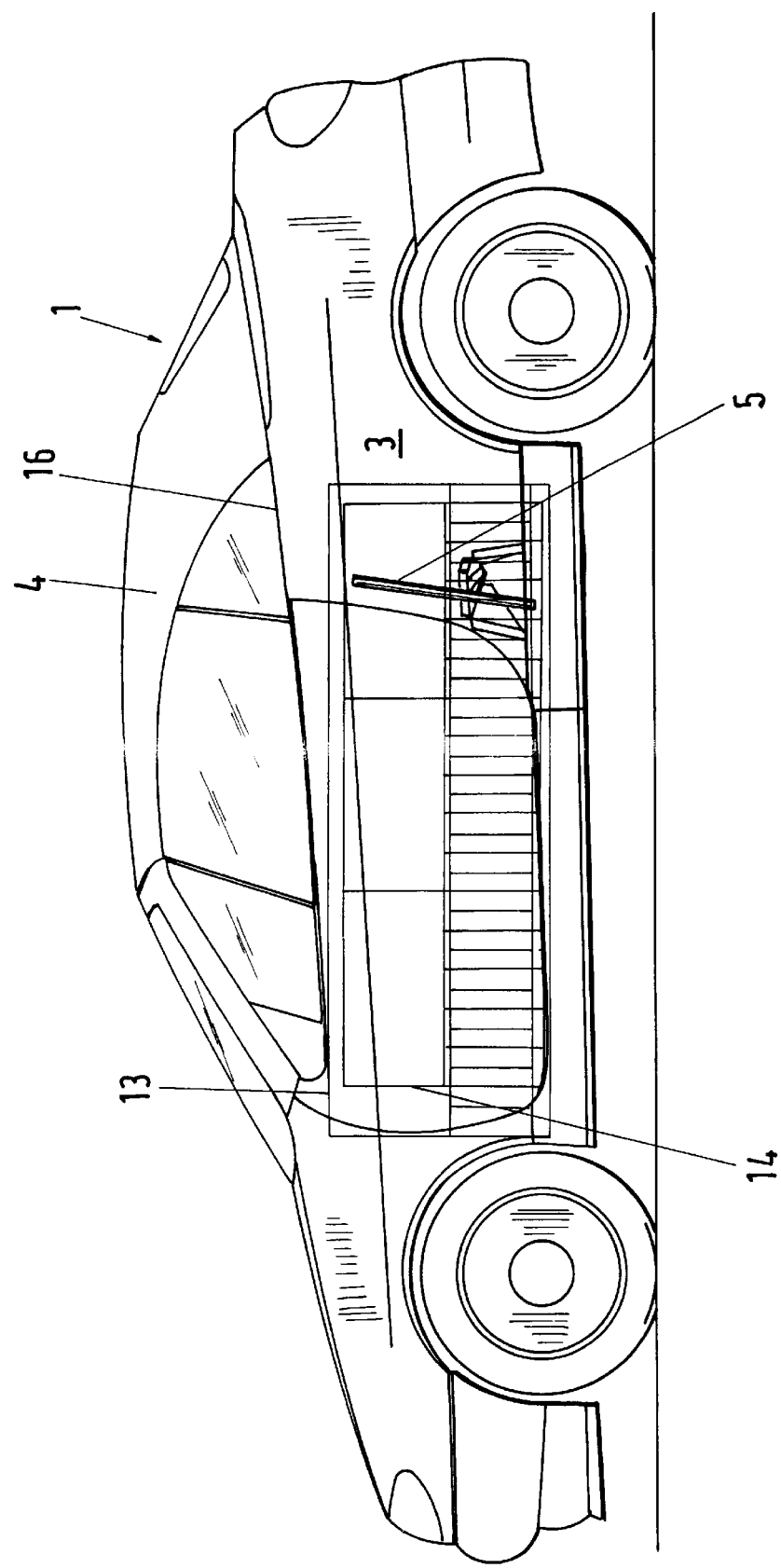
Figure 5:
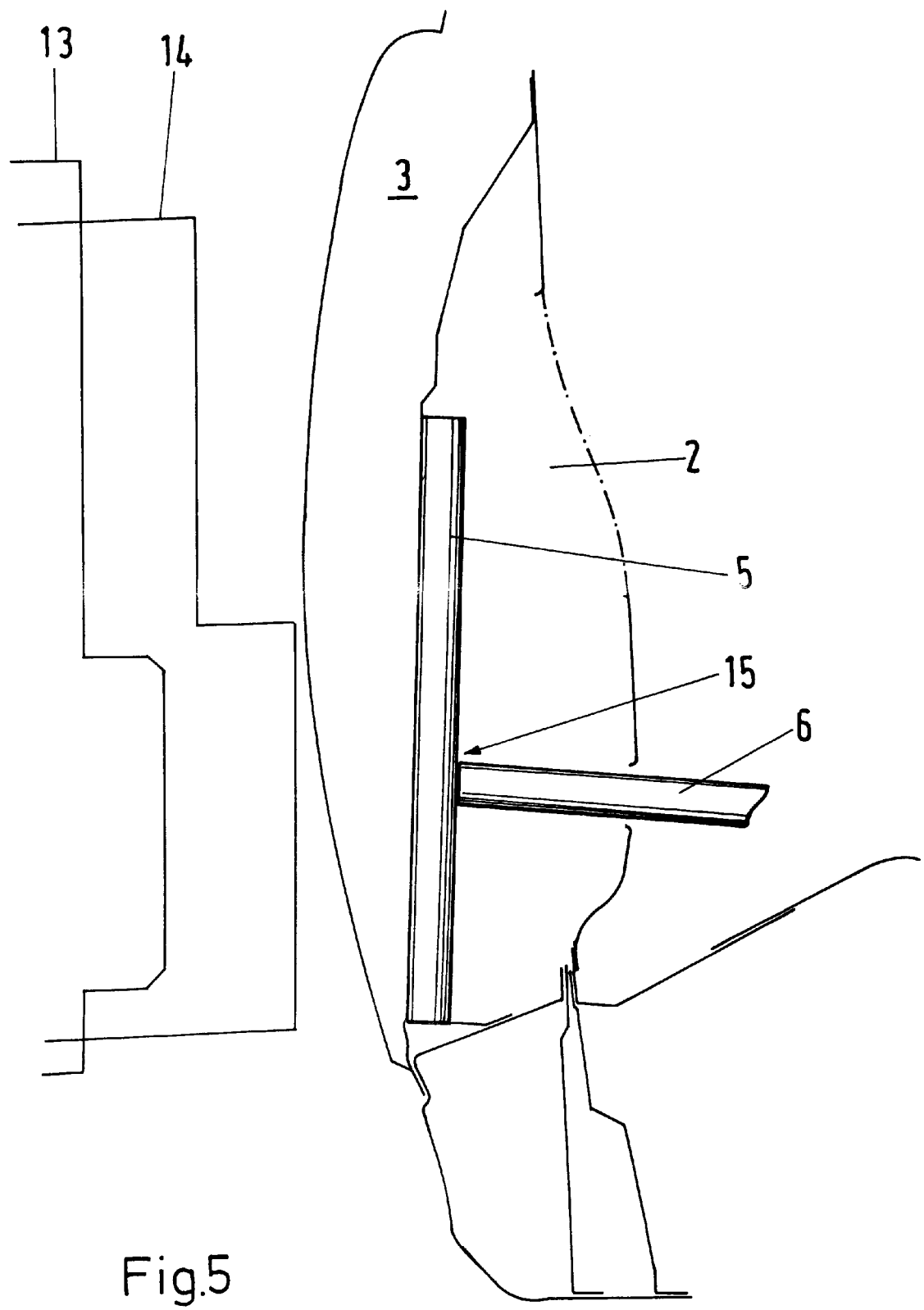
Figure 6:
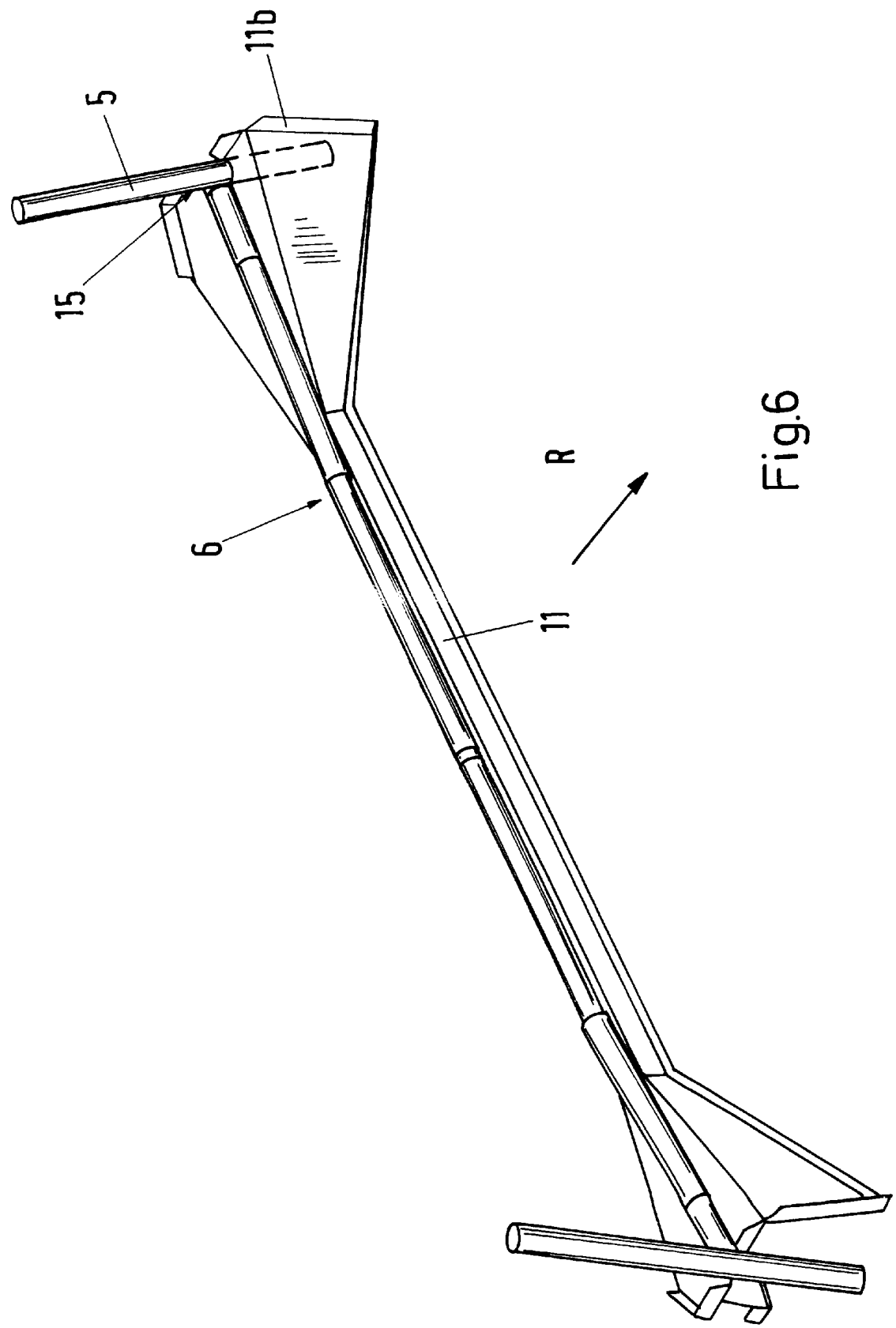
Figure 7:
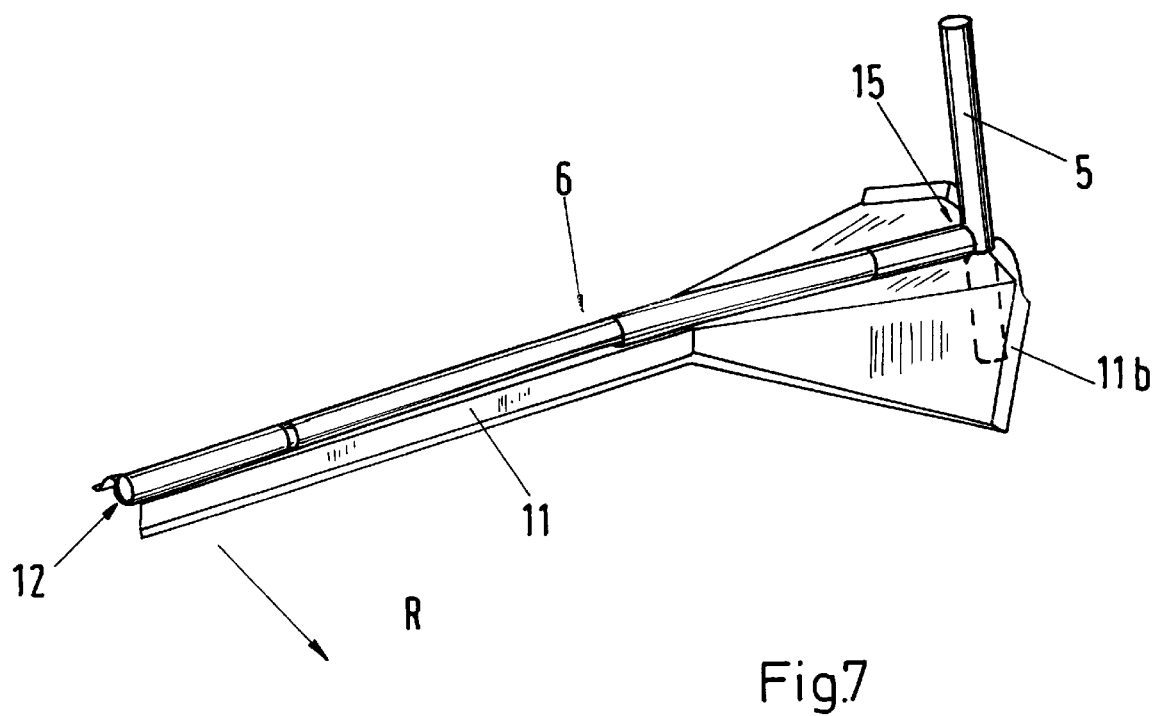
Figure 8:
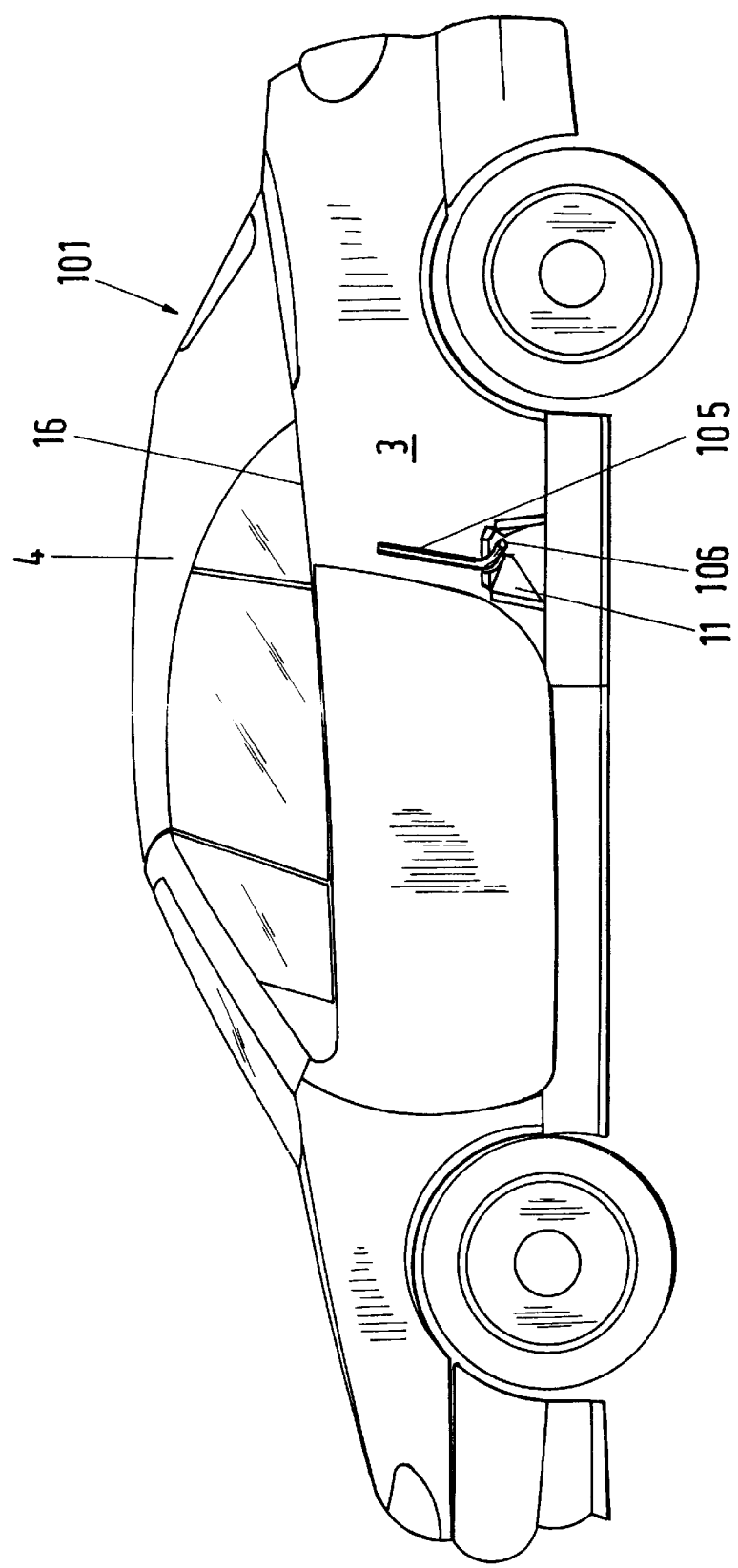
Figure 9:
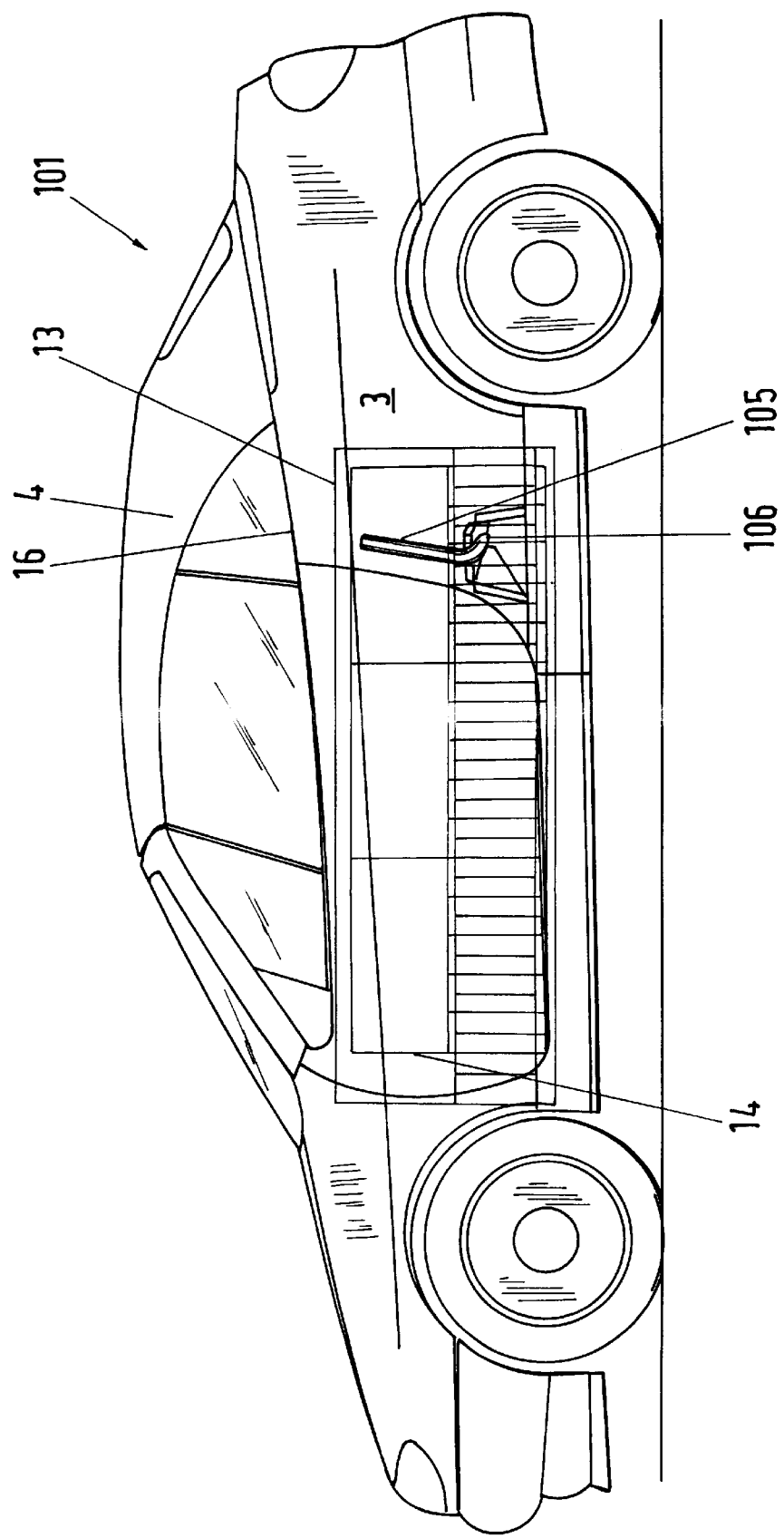
Figure 10:
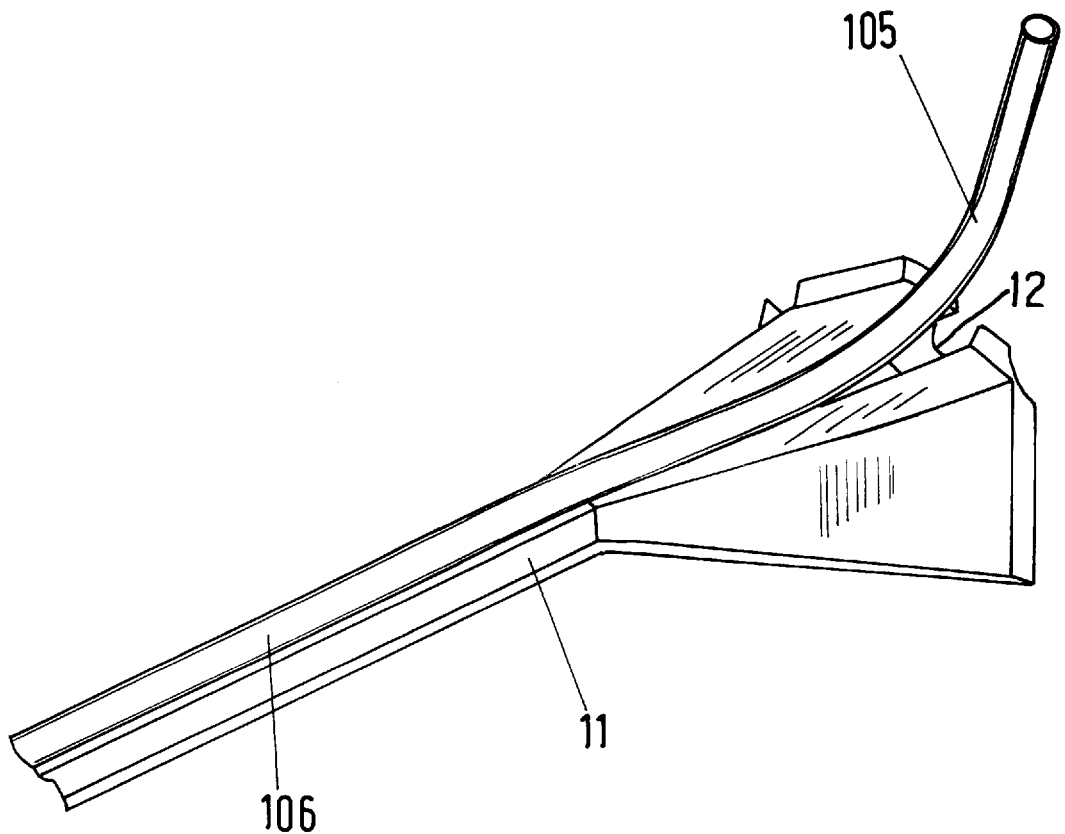
Figure 11:
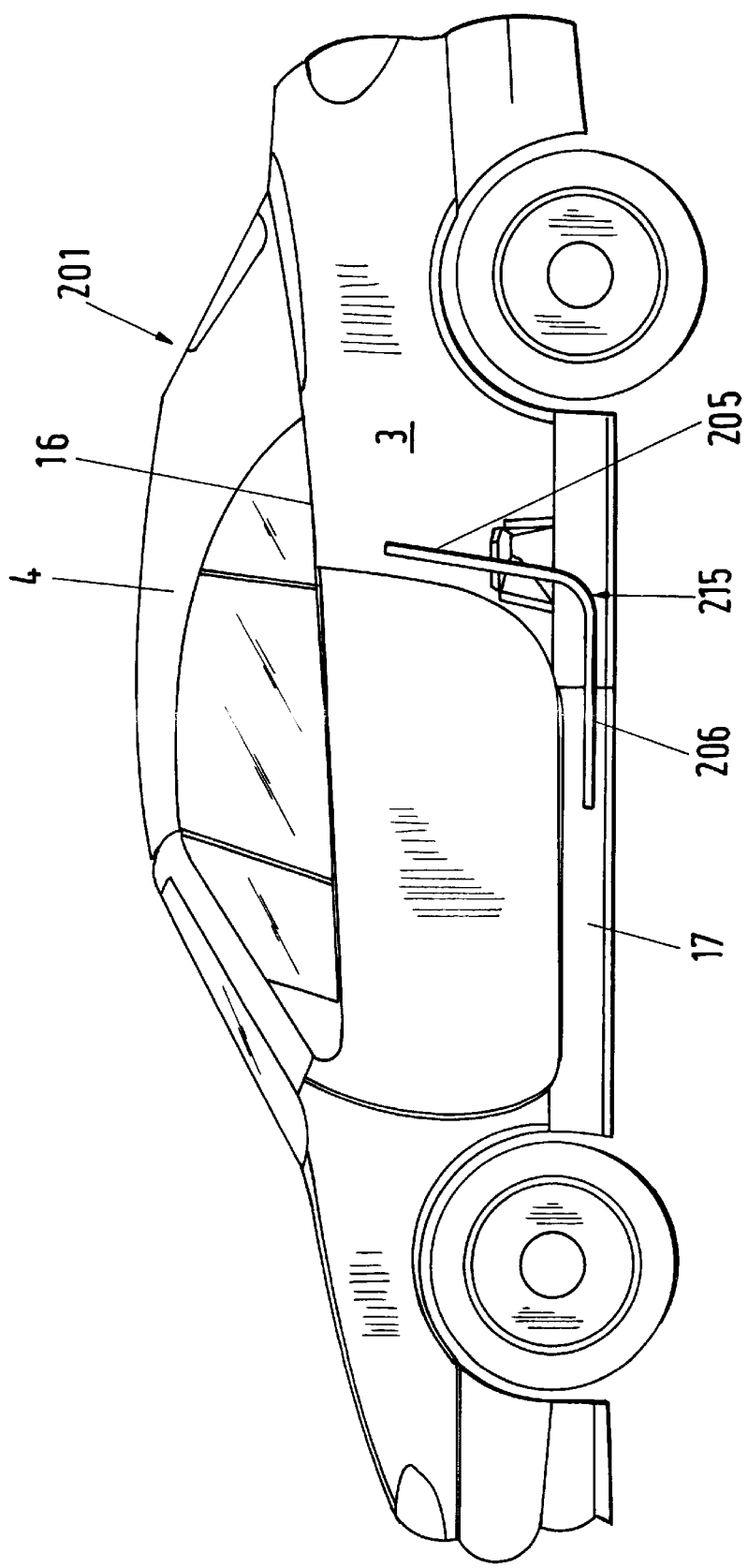
Figure 12:
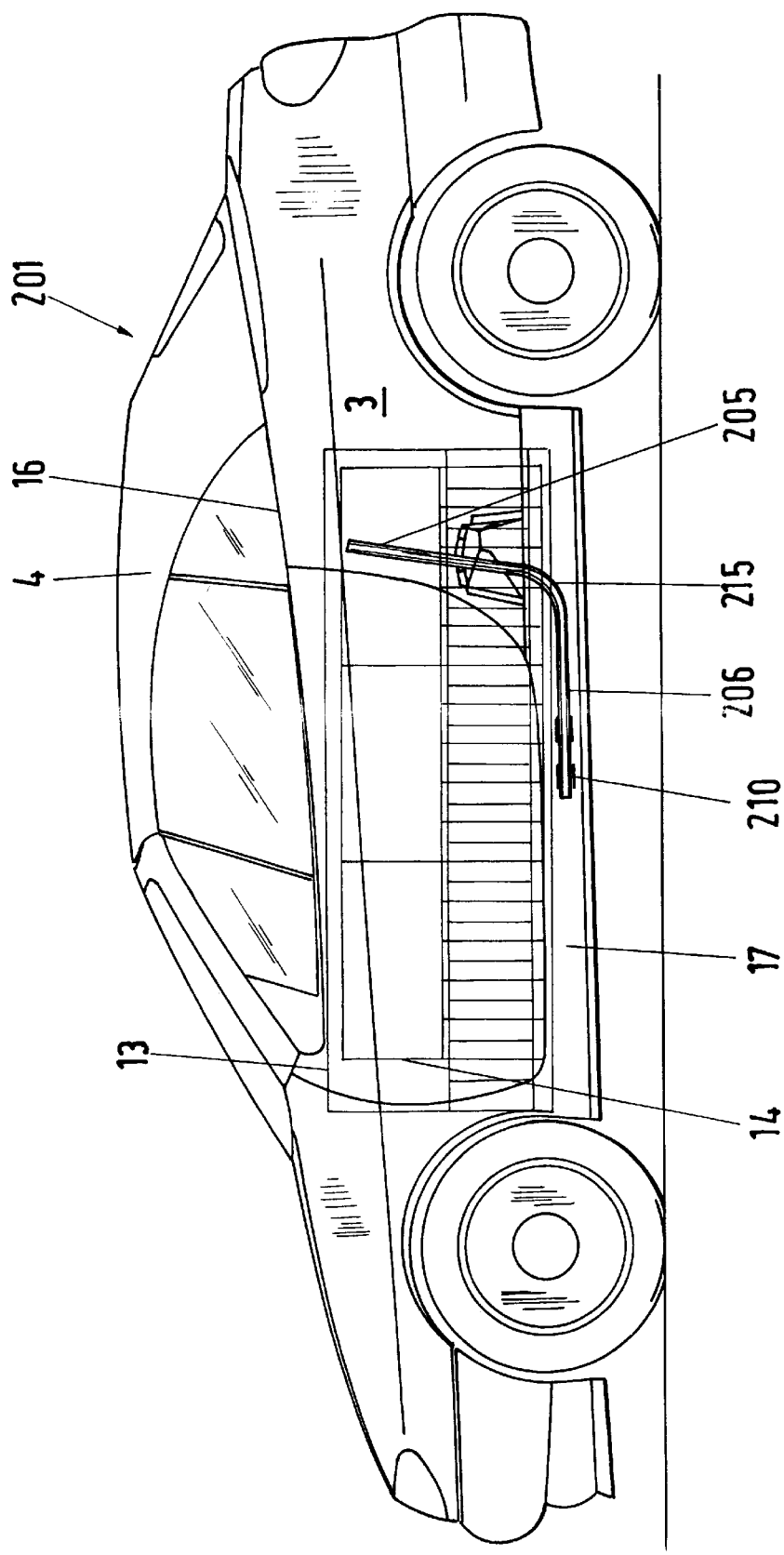
Figure 13:
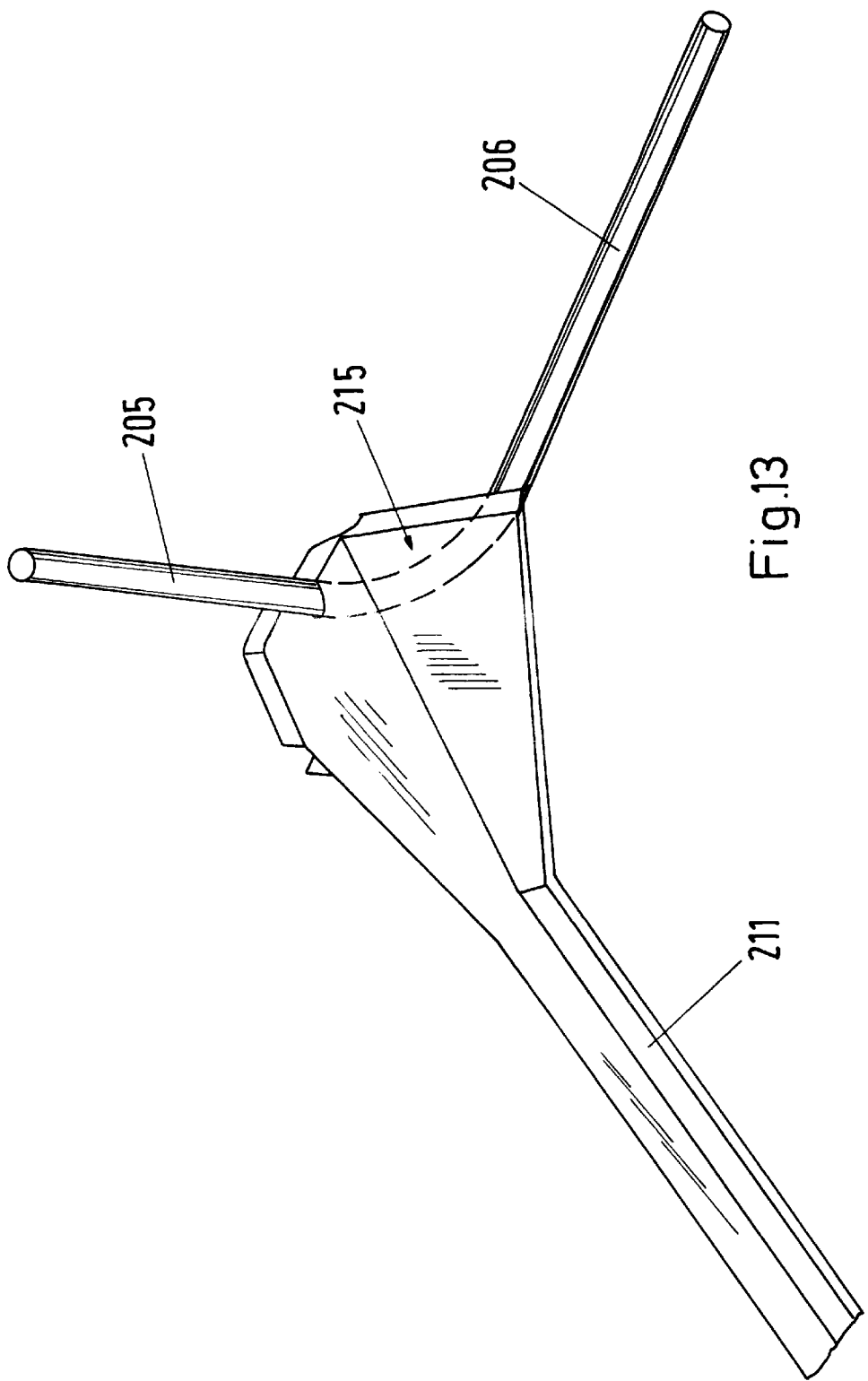
Figure 14:
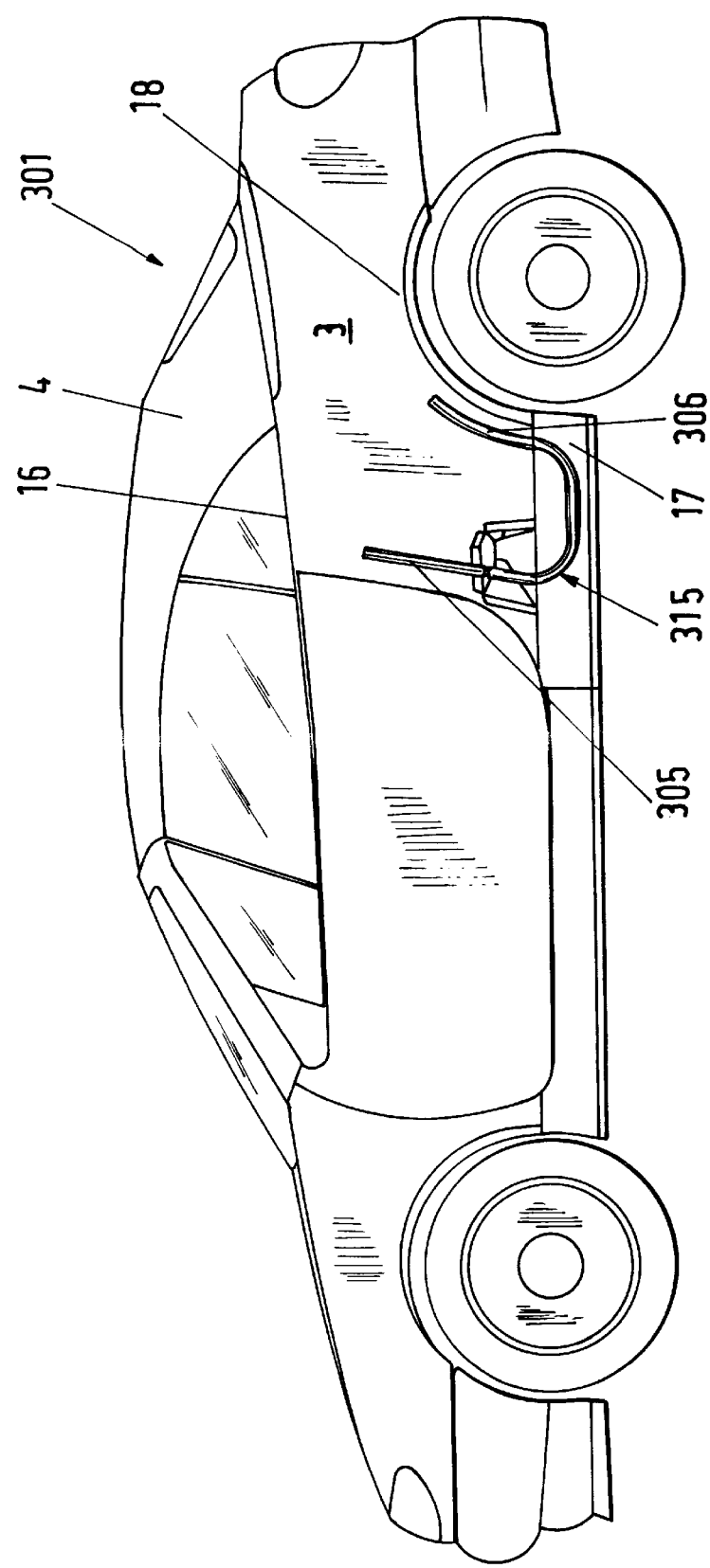
Figure 15:
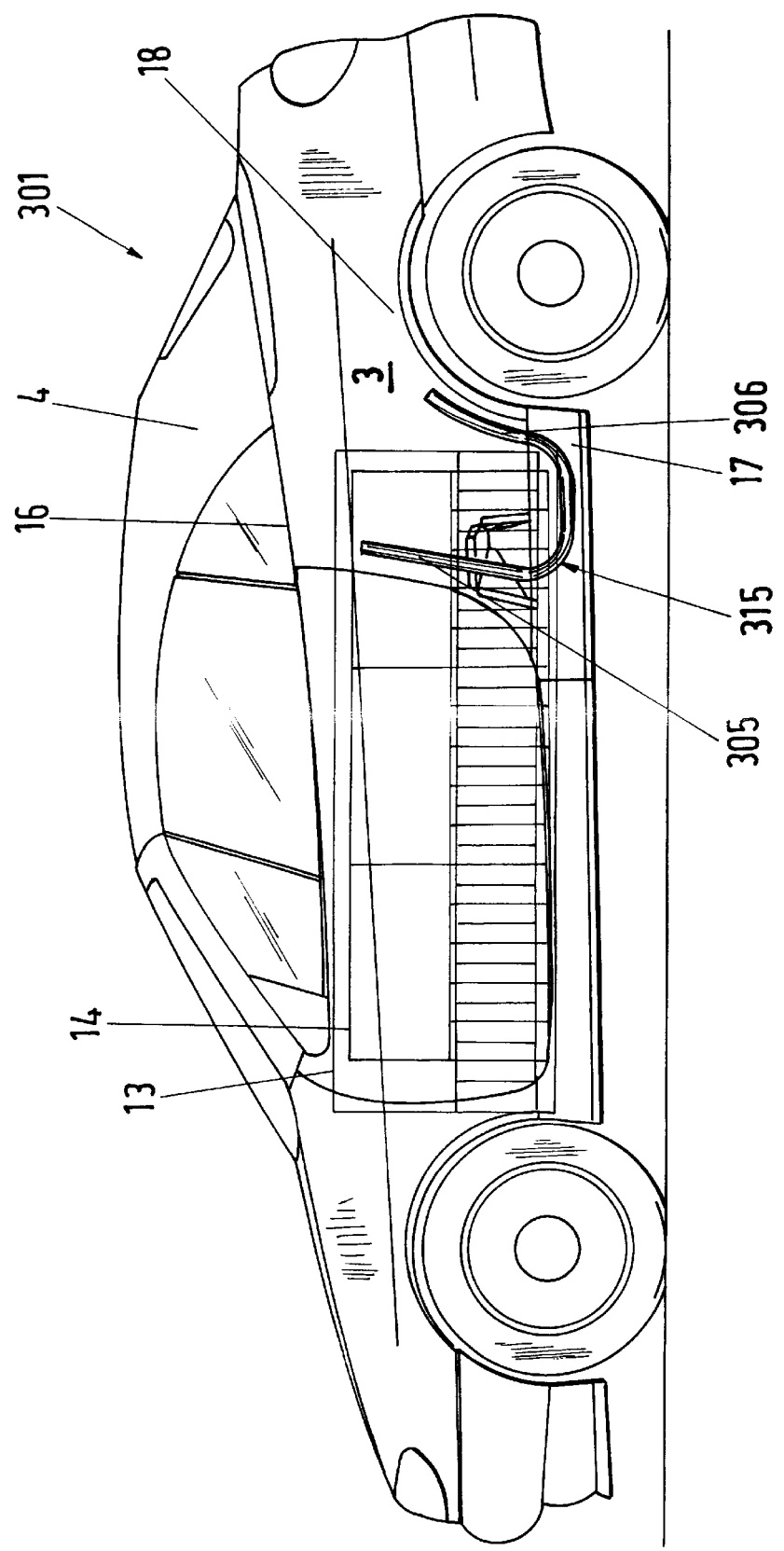
Figure 16:
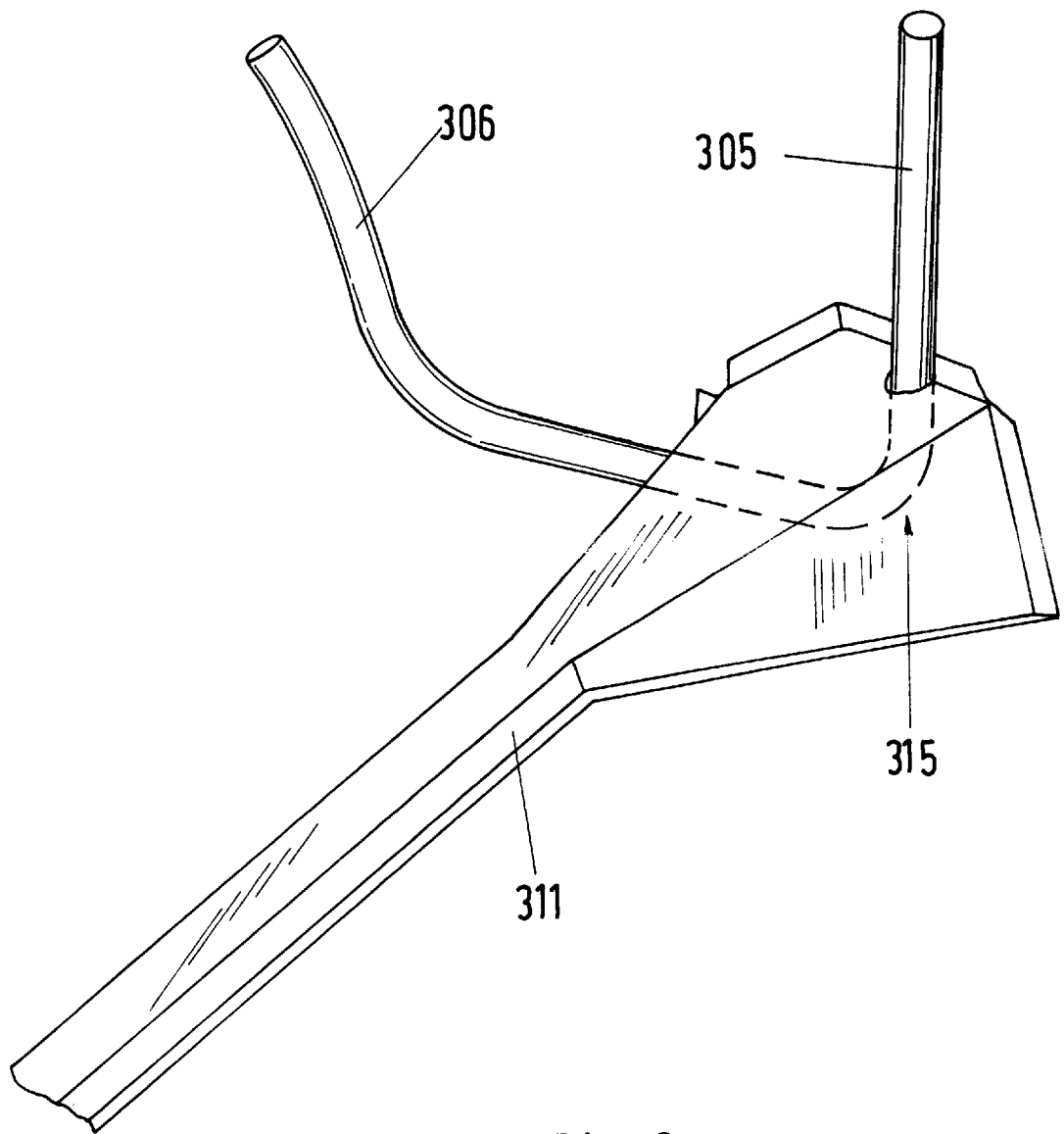

FIG. 1 shows an inventive motor vehicle in a first embodiment with cantilever arms, extending in the direction of the longitudinal center plane of the vehicle, in side view, FIG. 2 shows a section through the vehicle of FIG. 1, approximately along the line II—II of FIG. 1, FIG. 3 shows a section approximately along the line III—III in FIG. 1, FIG. 4 shows a view similar to that of FIG. 1, with diagrammatically indicated standard barriers against a side impact, FIG. 5 shows a view of a detail from FIG. 2 with the indicated barriers, FIG. 6 shows a perspective view of the reinforcing profiles and cantilever arms, shown in FIGS. 2 and 3, FIG. 7 shows a view similar to that of FIG. 6, the cantilever arm being truncated in the representation, FIG. 8 shows a second example of the object of the invention in side view, FIG. 9 shows a view similar to that of FIG. 8, the standard barriers being drawn diagrammatically, FIG. 10 shows a perspective detailed view of a reinforcing pipe and the cantilever arm of FIG. 8, FIG. 11 shows a third example of the object of the invention in side view, FIG. 12 shows a view similar to that of FIG. 11, the standard barriers being shown, FIG. 13 shows a perspective detailed view of the reinforcing profile and the cantilever arm of FIG. 1, FIG. 14 shows a fourth example of the object of the invention in side view, FIG. 15 shows a view similar to that of FIG. 14, with diagrammatically indicated standard barrier, and FIG. 16 shows a perspective detailed view of the reinforcing profile and cantilever arm of FIG. 14.

DESCRIPTION OF THE PREFERRED EMBODIMENTS

The inventive motor vehicle 1, 101, 201, 301 has an interior B column 2, which is indicated diagrammatically in FIGS. 1 and 5 and formed essentially by a deep drawn part, which is welded into the side walls 3. This B column 2 is not connected to the roof 4, but ends below the window breast 16.

In the region of the B column 2, at least one reinforcing profile 5, 105, 205, 305, which runs essentially vertically and from which a cantilever arm 6, 106, 206, 306 is disposed, extends on either side of the motor vehicle 1, 101, 201, 301. The cantilever arm 6, 106, 206, 306 diverts forces, which act laterally on the vehicle 1, 101, 201, 301 and are encountered by the side walls 3 during accidents, from the vertical reinforcing profiles 5, 105, 205, 305 into remote regions of the car body, which are connected with the cantilever arm 6, 106, 206, 306 at least in the region of its end averted from the reinforcing profile 5, 105, 205, 305.

In the examples, the reinforcing profile 5, 105, 205, 305 is disposed directly within the B column 2 that is formed. This is advantageous when the vehicle is constructed as a convertible, as is shown here. Depending on the construction of the motor vehicle, however, other arrangements of the reinforcing profile 5, 105, 205, 305 in the region of the B column 2 are also possible. For example, the reinforcing profiles 5, 105, 205, 305 could border the B column on either side or be welded to this column on the outside. Different constructions are entrusted to the expert here, who will take into consideration the geometric and static relationships of the car body.

In the present examples, the reinforcing profiles 5, 105, 205, 305, as well as the cantilever arms 6, 106, 206, 306, are constructed as round tubular pieces or comprise several tubular pieces. This need not necessarily be so. Box-shaped profiles or differently shaped hollow or solid profiles, which are adapted to the shape of the car body, also come into consideration. However, the round pipe construction shown here has the advantage of having available a production part, which is easily handled in manufacturing and, above all, is inexpensive and, when the walls are appropriately thick, has high bending stability. The round cross section, which has been selected, offers the same resistance to forces, which do not act precisely at 90° to the side walls 3 and to forces acting perpendicularly to the side of the car body.

A vertical profile with thick side walls is preferred, so that it largely withstands forces acting at a point without being deformed and transfers the forces acting to the cantilever arm.

In the first example shown in FIGS. 1 to 7, in which the driving direction is indicated by the arrow R, the reinforcing profile 5 and the cantilever arm 6 are welded together, the reinforcing profile 5, as well as the cantilever arm 6 being constructed from tubular pieces. The cantilever arm 6, shown in FIG. 2, extends from the vertical profile 5, which is located in the side wall 3 in the region of the B column 2, transversely in the direction of the longitudinal center plane 7 of the vehicle. Moreover, in order to adapt to the geometric relationships in the vehicle 1, the cantilever arm 6, may not be able to run completely linearly and instead may have one or several bends 8 about horizontal and/or vertical axes. Cantilever arm 6 is formed especially in the region of such bends 8 by several pipe sections 6a, 6b, which are inserted into one another. The pipe sections 6a, 6b are welded together and form an appreciable overlapping region, which comprises not only the bends 8, but also adjoining regions, in order to ensure stability. The cantilever arms 6, extending from both sides to the longitudinal center plane 7 of the vehicle, are separated from one another by a central joint 9, so that the action of an impact on one cantilever arm 6 in the case of a side collision does not lead to an outwards movement of the other cantilever arm 6 in the direction of the side wall 3 of the vehicle, which is opposite the point of impact. Along its course, the reinforcing profile 5 is welded at least regionally to the side wall 3 or to the B column 2. Likewise, there are regions 10 on the cantilever arm 6, at which the cantilever arm 6 is firmly connected with the car body, for example, by welding.

In the present example, the cantilever arm 6 is held in a structural profile 11, which is adapted to the external cross section of the cantilever arm 6 and is, in turn, welded to the car body in the region of the pedestal for the rear seat bench. To accommodate the round cantilever arm, the structural profile 11 has a semicircularly shaped duct 12, shown, for example, in FIGS. 7 and 10, into which the pipe 6a, 6b of the cantilever arm 6 is inserted and welded along its outer wall. Fastening by other means, such as by gluing or bolting, also comes into consideration. The structural profile 11 also extends transversely over the vehicle and is welded at the edges at the flanges 1 lb to the side wall 3 and, in particular, to the B column 2.

When a lateral force acts on the side wall 3 of the vehicle 1, a torque, which depends on the height of the barrier 13 (barrier complying with the US Standard US-FM VSS 571.214) or 14 (barrier complying with the European Standard ECE-R95), simulating the side collision, will act about the welded point 15 of the cantilever arm 6 on the vertical, reinforcing profile 5, so that, aside from a horizontal force in the direction of the center 7 of the vehicle, a vertical force component, which results in a corresponding deformation of the vehicle floor group in the region of connection with the cantilever arm 6, also acts on the cantilever arm 6. Since a vertically upward directed movement of the end of the cantilever arm 6, averted from the vertical profile 5, can also result, for example, during an extremely low collision, such as that with a sports car, the connection to the structural profile 11 must be constructed correspondingly sturdily, so that the cantilever arm 6 cannot lift off from the structural profile 11 and the car body step below even when such a force is acting.

The second example (FIGS. 8 to 10) shows a course of the cantilever arm 106, which is basically similar to that of the cantilever arm in the first example. The cantilever arm 106 also extends in the direction of the longitudinal center plane 7 of the vehicle, so that the diversion of forces is undertaken in the same manner as in the first example. Here also, the cantilever arm 106 lies in a structural profile 11 and is welded to the latter at least regionally.

The decisive difference between this example and the first lies therein that the cantilever arm 106 and the vertical reinforcing profile 105 are constructed in one piece and that therefore the whole of the protection against a side collision comprises merely a bent pipe as component. From a manufacturing point of view, this can be realized particularly simply. The vertical reinforcing profile 105 therefore forms the end region of the pipe section representing the cantilever arm 106.

In the third example (FIGS. 11 to 13), the vehicle 201 has side collision protection, for which a cantilever arm 206 extends in the door sill 17 and runs in the driving direction. The length of the cantilever arm 206 can be varied depending on the vehicle structure. The cantilever arm 206 once again is constructed in one piece with the vertical reinforcing profile 205, so that here, as in the second example, once again only one appropriately deformed pipe is required for each side of the vehicle as side collision protection.

In the case of a collision with the side of the vehicle 201 (indicated in FIG. 12 by the barriers 13 and 14), the vertical profile 205 is bent inward, the region of the cantilever arm 206 in the sill 17 lying outside of the impact zone. Therefore, in the region of transition 215 between the vertical reinforcing profile 205 and the cantilever arm 206, a torque is generated about the longitudinal axis of the vehicle, so that the cantilever arm 206 which, in its region averted from the vertical reinforcing profile 205, is sturdily welded at the connecting sites 210 with the sill 17, is stressed in torsion. As a result, a considerable proportion of the collision energy is converted into torsional deformation of the cantilever arm 206. In this connection, it is important that the cantilever arm 206 lies outside of the collision region, as otherwise the whole of the pipe, consisting of the vertical reinforcing profile 205 and the cantilever arm 206, would be shifted in the direction of the longitudinal center plane of the vehicle and torsional stressing could not take place.

In a fourth example (FIGS. 14 to 16), the cantilever arm 306, as in the third example, also extends in the longitudinal direction of the vehicle 301 and, with that, lies parallel to the side wall 3. Once again, the reinforcing pipe 305 is constructed in one piece with the cantilever arm 306. However, the cantilever arm 306 does not extend in the driving direction; it extends instead in the direction of the rear wheelhouse 18, at which it is supported, after a section of it is passed previously through the door sill 17.

Like the transverse profile 211 of example 3, a transverse profile 311 acts, for example, as an additional reinforcement of the car body in the transverse region. However, it does not accommodate the cantilever arm 306. The latter can be held in the door sill 17 also by means of a separate structural profile, which is adapted to the outer shape of the door sill 17 (not shown).

At least in its region supported at the wheelhouse 18, the cantilever arm 306 runs outside of the collision zone, as indicated by the barriers 13 and 14 in FIG. 15. The region of the cantilever arm 306, supported in the door sill 17, also lies outside the collision zone.

When a lateral force acts on the vertical reinforcing profile 305, a torque is exerted about the region 315, connecting the vertical reinforcing pipe 305 and the cantilever arm 306, so that torsion is exerted on the cantilever arm 306. Since the cantilever arm 306 is welded to the wheelhouse, this part of the pipe cannot be lifted from the sheet metal forming the wheelhouse 18. Instead, as a result of the torque about the longitudinal axis of the vehicle, on the one hand, the cantilever arm 306 is twisted and, on the other, the exterior sheet metal of the wheel house 18 can be deformed inwards and, with that, contribute to the dissipation of energy.

Once again, the reinforcing profile 305 and the cantilever arm 306 are constructed in one piece. However, this is not essential even when the cantilever arm is disposed in the longitudinal direction of the vehicle. Instead, welding, bolting, gluing or other known means of fastening pipe sections would come into consideration here. At least in its end region averted from the reinforcing profile 305, the cantilever arm 306 must be fastened adequately to the sheet metal of the car body, in order to involve this sheet metal in every case in the deformation. In the torsion region, that is, in the door sill 17, such a fastening is required at least in the regions of the bending site 315 averted from the vertical pipe.

It is also possible to connect a vertical reinforcing profile 5, 105, 205, 305 with several different cantilever arms 6, 106, 206, 306 in order to attain adequate protection against laterally acting forces particularly also in the case of collisions, which also affect the door sill region. For example, a torsion pipe 206 can also be combined with a cantilever arm 306, which extends into the rear wheelhouse 18, or also with a cantilever arm 6 or 106, which is disposed transversely to the driving direction. The cantilever arms may also proceed individually or in combination in a manner deviating from the examples given, perhaps at an angle to the floor group.

In any case, the safety measures shown with regard to collision from the side are possible without visually impairing the vehicle. The side windows can continue to be guided without a frame and a roll bar does not have to be installed. The cantilever arms 6, 106, 206, 306 extend in cavities of the car body, which are present anyhow or are mounted (6, 106) on the step forming the floor under the rear seat. Of course, such protection against side collisions can also be used in vehicles, in which the B column is connected to the roof.

What we claim is:

1. A motor vehicle having a vertical longitudinal center plane, comprising a car body having side walls, reinforcing pipe members each having a generally upright pipe part extending along said side walls, said reinforcing pipe members each including a lateral pipe arm extending laterally from the respective upright pipe part, a structural member connected to said car body, said structural member extending between said side walls and generally underlying said lateral pipe arms, said structural member having a first engaging part and said lateral pipe arms each have a second engaging part which overlie and which engage said first engaging part, said first engaging part having a generally semi-circular cross sectional configuration, said lateral pipe arms having a generally circular cross sectional configuration each having a radius which generally conforms to the radius of said semi-circular cross-sectional configuration of said first engaging part, a connection connecting each of said second engaging parts of said lateral pipe arms to said underlying first engaging parts of said structural member such that at least a portion of the energy resulting from a lateral force applied to said upright pipe part is transferred to said structural member underlying said lateral pipe arms, each of said lateral pipe arms extending transversely from the respective upright pipe arm in a direction toward said vertical longitudinal center plane, each of said lateral pipe arms having a terminating end which extends substantially to said vertical longitudinal center plane with the terminating end of one lateral pipe arm being unconnected to the terminating end of the other lateral pipe arm.

2. A motor vehicle according to claim 1 wherein said motor vehicle is a coupe or a convertible having windows, said side walls of said car body limiting the occupants space below the bottom edge of the windows, said car body including a generally upright B column which terminates at the belt line of the vehicle, said upright B column being disposed in said walls, said upright part of each of said reinforcing members being disposed in the region of the respective B column.

3. A motor vehicle according to claim 1 wherein said lateral pipe arm comprises a plurality of pipe sections with at least a portion of one pipe section being disposed in at least a portion of another pipe section such that said portions overlap one another.

4. A motor vehicle according to claim 1 wherein said structural member is a one-piece member extending between said car body side walls.

* * * * *